(12) United States Patent
Quinesser (10) Patent No.: US 11,534,029 B2
(45) Date of Patent: Dec. 27, 2022

(54) BAR BLENDER

(71) Applicant: KONINKLIJKE PHILIPS N.V., Eindhoven (NL)

(72) Inventor: Albert Quinesser, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 167 days.

(21) Appl. No.: 16/768,942

(22) PCT Filed: Nov. 22, 2018

(86) PCT No.: PCT/EP2018/082140
§ 371 (c)(1),
(2) Date: Jun. 2, 2020

(87) PCT Pub. No.: WO2019/110311
PCT Pub. Date: Jun. 13, 2019

(65) Prior Publication Data
US 2021/0161331 A1  Jun. 3, 2021

(30) Foreign Application Priority Data

Dec. 4, 2017  (EP) .................................. 17205174

(51) Int. Cl.
*A47J 43/08* (2006.01)
*B01F 35/221* (2022.01)
*A47J 43/044* (2006.01)

(52) U.S. Cl.
CPC ..... *A47J 43/082* (2013.01); *B01F 35/221422* (2022.01); *A47J 2043/04427* (2013.01)

(58) Field of Classification Search
CPC ............ A47J 43/082; A47J 2043/04427; A47J 2043/04409; A47J 2043/04418; B01F 35/221422
(Continued)

(56) References Cited

U.S. PATENT DOCUMENTS 3,271,013 A * 9/1966 Chambers ............. A47J 43/082
                                                       310/239
7,854,194 B2   12/2010 Siu
(Continued)

FOREIGN PATENT DOCUMENTS

CN      201070295 Y    6/2008
CN      201571983 U    9/2010
(Continued)

OTHER PUBLICATIONS

International Search Report and Written Opinion dated Jan. 31, 2019 for International Application No. PCT/EP2018/082140 filed Nov. 22, 2018.

*Primary Examiner* — Marc C Howell
(74) *Attorney, Agent, or Firm* — Maschoff Brennan (57) ABSTRACT

A bar blender comprises a blender blade driven by a motor (16) in a main housing (10). The handle (12) of the housing has a motor speed control button (14). A separate visual display on the housing shows the user the speed setting corresponding to the current position of the control button. The visual display is based on a mechanical linkage between the control button and the visual display to cause a display element to follow the button as it is moved by the user. This is provides a simple and reliable feedback to the user.

15 Claims, 8 Drawing Sheets

(58) Field of Classification Search
USPC .......................................................... 366/129
See application file for complete search history.

(56) References Cited

U.S. PATENT DOCUMENTS

| | | |
|---|---|---|
| 8,529,118 B2 | 9/2013 | Davis |
| 10,070,756 B2 | 9/2018 | Planegger |
| 2009/0303830 A1 | 12/2009 | Wilson |

FOREIGN PATENT DOCUMENTS

| | | |
|---|---|---|
| CN | 202960204 U | 6/2013 |
| CN | 103230230 A | 8/2013 |
| CN | 203953410 U | 11/2014 |
| CN | 204500411 | 7/2015 |
| EP | 3138450 | 3/2017 |
| JP | 2011055934 | 3/2011 |
| RU | 2492791 C2 | 9/2013 |
| WO | 2007/007448 | 1/2007 |
| WO | 2010/012719 | 2/2010 |
| WO | 2011/113082 | 9/2011 |
| WO | 2015/078853 | 6/2015 |

\* cited by examiner

BAR BLENDER

CROSS REFERENCE TO RELATED APPLICATIONS

This application is the U.S. National Phase application under 35 U.S.C. § 371 of International Application No. PCT/EP2018/082140 filed Nov. 22, 2018, published as WO 2019/110311 on Jun. 13, 2019, which claims the benefit of European Patent Application Number 17205174.0 filed Dec. 4, 2017. These applications are hereby incorporated by reference herein.

FIELD OF THE INVENTION

This invention relates to bar blenders having a speed adjustment function.

BACKGROUND OF THE INVENTION

Bar blenders with a motor speed adjustment function are known from WO2015/078853A, in which a button on the handle can be depressed by the user, and the greater the movement of the button, the greater the speed setting of the motor.

WO2010/012719A discloses a kitchen appliance in which a wheel in the handle controls the motor speed and a separate LED display controlled by a microprocessor indicates the motor speed.

Other ways of providing feedback on the speed setting can be provided to the user, for example by vibrating the push button or by an audible sound, but the user may have difficulty seeing, hearing or feeling the feedback during use due to vibrations and noise. The purpose of the invention is to provide visual feedback of the current speed setting to the user in a simple and reliable manner.

SUMMARY OF THE INVENTION

The invention is defined by the claims.

According to an aspect of the invention, there is provided a bar blender comprising:

a main housing having a handle grip portion;

a motor within the housing for driving a blender tool;

a speed control circuit in the housing for controlling the speed of the motor;

a control button located at the handle grip portion for progressive movement by a user over a predetermined continuous range to operate the speed control circuit to set the motor speed to one from a corresponding range of motor speeds; and a visual display on the main housing remote from the control button and facing the user in use, wherein the visual display comprises a display element for indicating the control button position over a predetermined range of positions indicative of the motor speed set by the user, and a mechanical linkage between the control button and the visual display to cause the display element to provide the user with a continuous visual indication of the motor speed setting as the control button is moved by the user.

The invention thus provides a simple and reliable mechanical way to show the user the current motor speed setting that corresponds to the position of the control button. In other words, the visual indication of the motor speed setting is based on and actually driven by the mechanical actuation of the control button, rather than by taking electrical measurements of for example voltage or current or by measuring the output speed at the motor shaft. Thus a simple mechanical arrangement is provided for giving a speed setting indication.

The display element may be a movable display element. In such case, the mechanical linkage may cause the movable display element to follow the control button as the latter is moved by the user. The movement and/or instantaneous position of the movable display element may then be indicative for the motor speed setting.

Thus, the motor speed setting can be shown in a simple and reliable mechanical way without the need for any electrical circuitry or lights, or vibration or tone generators.

As in WO2015/078853A, the speed control circuit may comprise a travel sensing circuit, and the control button may be arranged to drive a travel element for controlling the travel sensing circuit to set the motor speed. A return spring such as a coil spring may be provided for biasing the control button to an initial button position corresponding to an end of the range of button positions and to a zero position for the motor speed indicated by the display element; the other end of the range of button positions and display positions corresponding to a maximum motor speed setting.

As in WO2015/078853A, the speed control circuit may be controlled to provide a step increase in speed when the control button is moved to its final position. The range of movement of the control button may be limited to at most 20 mm, preferably at most 10 mm. Preferably, the control button is moved by pushing, thereby to depress the control button, but alternative arrangements are envisaged, such as rotary buttons and wheels.

The visual display is preferably on an end surface of the housing remote from the blender blade, so that it is easily visible.

The visual display may comprise a fixed cover through which the display element is visible. Conveniently, the visual display comprises an index, such as a printed or engraved icon or symbol, to indicate the speed setting. The display element may be arranged to move relative to a fixed display element to provide a variable display indicative of the motor speed setting.

The movable display element and/or the fixed display element for example have a color pattern or line pattern such that the relative position of the movable display element provides a variable color or line pattern as the variable display. For example, the amount of one color which is visible (e.g. the color of the movable element which is different to the color of the fixed display element) is indicative of a speed level. Alternatively or additionally a movable edge line may provide a movable marking along a fixed scale.

The mechanical linkage may comprise means for providing a predetermined, preferably non-unity, gearing ratio between the movements of the control button and of the display element. This facilitates the design of the visible display that operates over an easily visible range even when the range of actuation of the control button may be limited. The mechanical linkage may comprise meshing gears, and they may comprise a worm gear coupled to each of the moveable display element and the control button, and gears meshing with the worm gears to cause the control button to drive the movable display element with the predetermined gearing ratio. The gearing ratio may be from 1 to 3, for example from 1.5 to 2.5 i.e. preferably about 2.

The visual display may be further adapted to provide the user with a continuous visual indication of the motor power consumption.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a bar blender comprising a tool, such as a blade, a whisking tool or the like, driven by a motor in a main housing. The main housing has a handle with a motor speed control button. A separate visual display on the housing shows the user the speed setting corresponding to the current position of the control button. The visual display is based on a mechanical linkage between the control button and the visual display. The mechanical linkage actuates the display element to provide the user with a visual indication of the current motor speed setting. The display element may be a movable display element. In such case, the mechanical linkage may causes the movable display element to follow the control button as it is moved by the user. This provides a simple and reliable feedback to the user.

Detailed examples will now be described, which show the invention applied to a bar blender having a push button as control button. The same configuration can however be applied with other configurations of control button. The bar blender of WO2015/078853 will first be described with reference to FIGS. 1 to 8, and then a modification of this bar blender, that embodies the invention, will be described with reference to FIGS. 9 to 12.

Figure 1:
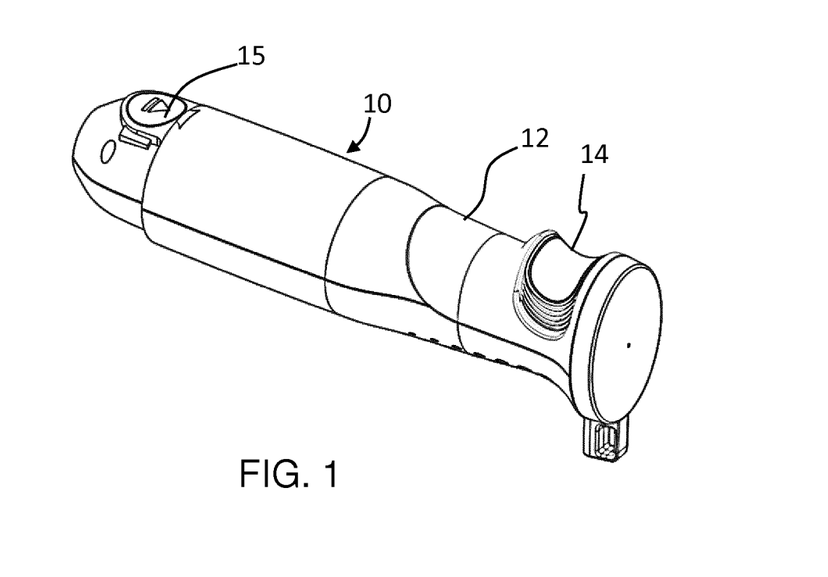
FIG. 1 shows the bar blender of WO2015/078853A in perspective view.

FIG. 1 shows a first example of bar blender in perspective view.

The blender comprises a main housing 10 having a handle grip portion 12. A control button 14 is at the handle grip portion for controlling the motor speed. In this example, the control button 14 further controls the on-off actuation of the motor. Thus, a single control button 14 is provided for controlling motor actuation and speed. In other examples, the on-off actuation may be controlled via a separate button. In this example, the control button comprises a push button 14, positioned at the location of the user's index finger when gripping the handle. A release button 15 enables fitted attachments such as a blending tool or whisking tool to be swapped over.

Figure 2:
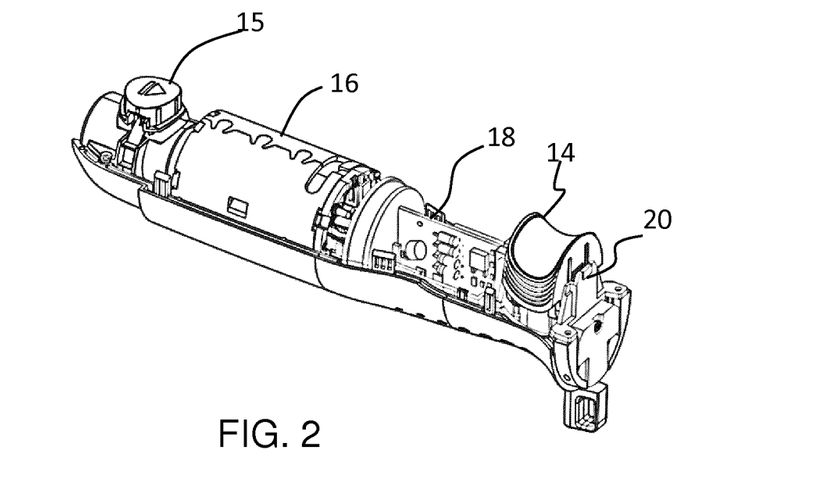
FIG. 2 shows the bar blender of FIG. 1 with the top cover removed to show the arrangement of internal components.

FIG. 2 shows the bar blender with a top cover removed to show the arrangement of internal components. The blender has a motor 16 within the main housing for driving a blender blade or other attachments.

Within the handle grip part, there is a control circuit for the blender, including circuitry mounted on a PCB 18 for controlling the motor speed.

In this example shown, this circuitry includes a resistor circuit for providing an adjustable motor drive. This resistor circuit can comprise a chain of resistors connected in series, which results in a step type control. To implement the motor drive control, a slider is in contact with the resistors, and the movement of the slider results in selection of one of the resistors. This provides a discrete control approach. A directly analogous alternative is to use an analogue potentiometer.

The control button 14 is mounted within a housing 20 which enables the control button 14 to slide relative to the housing. For this purpose, the control button 14 is carried by a carrier (although it should be understood that the carrier and control button can be a single integrated component). The control button 14 and its carrier form part of what is termed in this document a "control button arrangement". The control button can be considered to be the external feature which the user presses, and the carrier is the structure beneath.

Figure 3:
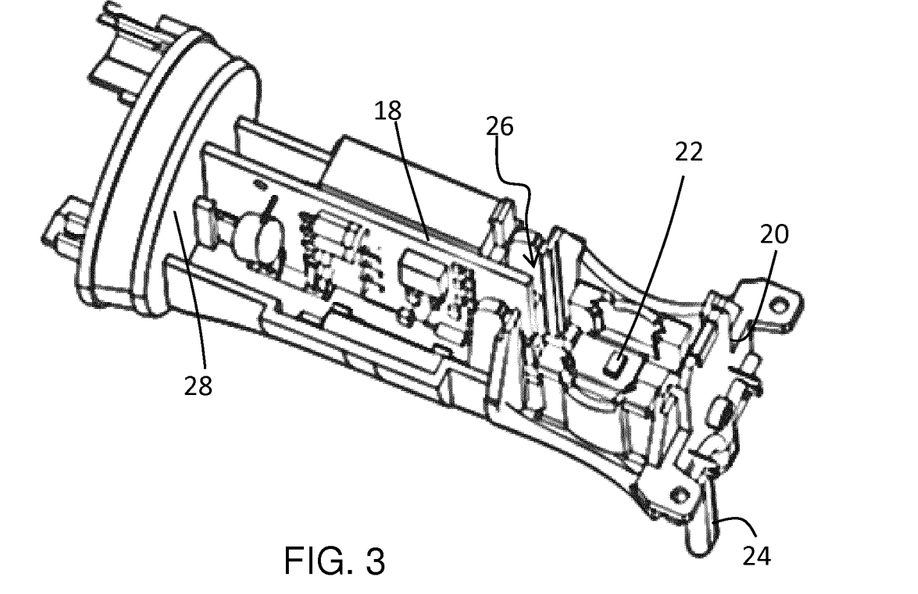
FIG. 3 shows in more detail the housing which carries the control button.

FIG. 3 shows in more detail the housing 20 which carries the control button arrangement (and shows the control button removed). The housing forms a cradle for the control button and its carrier. At the base of the housing 20 is a micro switch 22 functioning as a power switch. This is a switch which is actuated by very little physical force, typically through the use of a tipping point mechanism (otherwise known as an "over-center" mechanism). Switching takes place at specific and repeatable positions of the actuator and with a small amount of movement required between the different switch positions.

The mains input cable 24 is electrically connected to the rest of the device through the power switch 22, so that the power switch 22 controls the supply of power to the remainder of the device, and thus functions (at least) as the power supply control for the motor.

The mains cable 24 is to one side of the housing 20 (at the top end of the main housing), and the other side of the housing has a slot 26. The control button arrangement includes an electrical contact which slides up and down the slot 26 when the control button is moved. This electrical contact interfaces with electrical contact tracks on the PCB 18, which connect to the discrete resistors mentioned above. For this purpose, an edge of the PCB 18 is aligned with the slot 26 as shown. The motor is not shown in FIG. 3, but a motor support which fixes to the motor is shown as 28.

Figure 4:
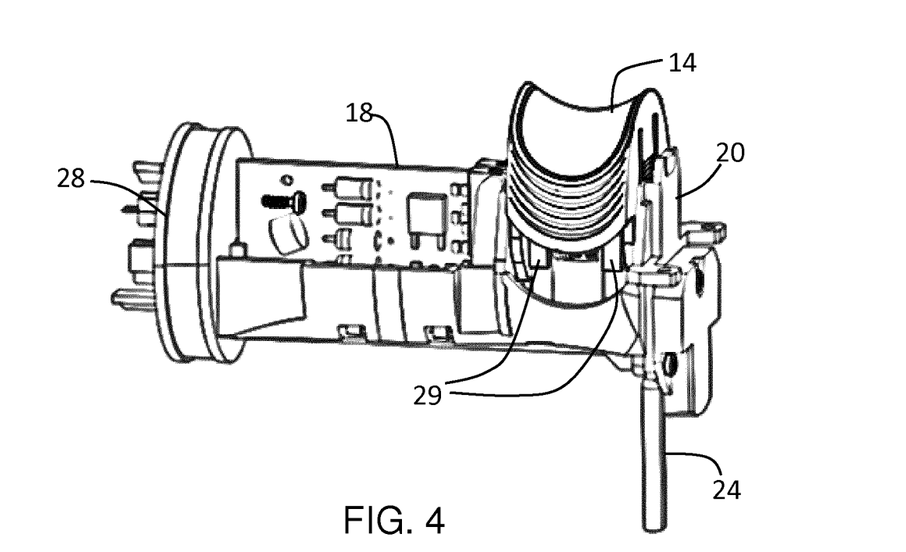
FIG. 4 shows in more detail the control button mounted in its housing.

FIG. 4 shows in more detail the control button arrangement mounted in its housing 20. The control button arrangement has retaining hooks 29 which clip the control button arrangement into the housing 20 thereby limiting the upward movement of the button. The downward movement is limited by a mechanical stop arrangement, which is engaged when the control button is fully depressed.

Figure 5:
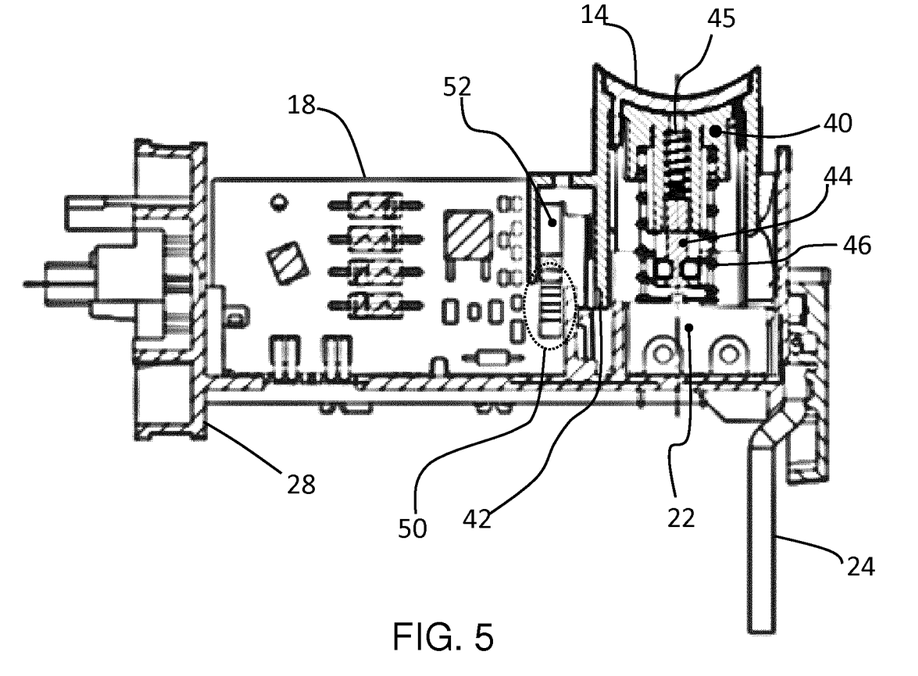
FIG. 5 shows a cross sectional view of the control button and its housing and shows the on/off function more clearly.

FIG. 5 shows a cross sectional view of the control button arrangement and its housing and shows the on/off function more clearly.

The control button 14 and its slidable carrier 40 can be seen more clearly. A base 42 of the carrier together with a corresponding part of the housing 20 define the mechanical stop mentioned above which limits the pressing-in of the control button 14.

At the base of the housing is located the micro switch (power switch) 22. A spring loaded pin 44 is carried by the slidable carrier 40, beneath the control button 14, for mechanically engaging with the power switch when the control button is first depressed. This spring loaded pin functions as a first actuator for mechanically actuating the power switch when the control button is first depressed.

The spring 45 of the spring loaded pin is located centrally inside the pin (which is hollow for this purpose) and biases the pin towards the power switch. The spring force is sufficient to activate the switch.

The carrier 40 is biased into the non-depressed position by a return spring 46. In the example shown, this is arranged concentrically outside the spring 45 of the pin 44, to provide a compact arrangement.

The spring loaded pin 44 is biased outwardly by the spring 45 and reaches a stop which means that it is just above the power switch when the carrier 40 is in the non-depressed position. There is a clearance of around 1 mm as explained below. The pin 44 can retract and a sliding sleeve arrangement enables this.

FIG. 5 also shows more clearly the resistor circuit PCB contacts 50 and the contact element 52 carried by the carrier 40. There can be two contact elements 52 if a double sided PCB is used, one for each side of the PCB, but only one can be seen in FIG. 5. The edge of the PCB 18 sits in the space between the two contacts 52. The relative position of the contacts 52 along the PCB edge determines which PCB tracks are electrically connected, which then determines the setting of the speed control circuit.

Figure 6:
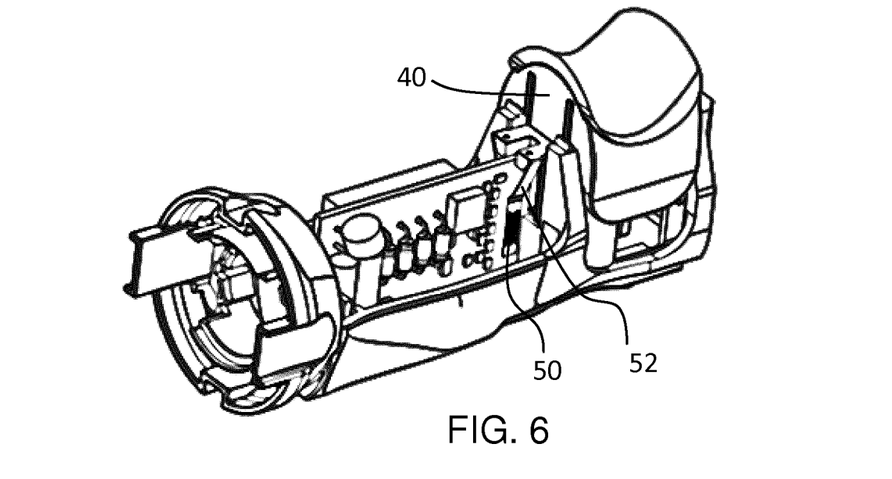
FIG. 6 shows the speed control function of the control button more clearly.

FIG. 6 shows the speed control function of the control button more clearly. The PCB 18 has resistor tracks 50, and sliding contacts 52 are mounted to move with the carrier 40 and engage with the PCB tracks. The sliding contacts (of which there may be one or more) control the coupling of resistors. In this way, a circuit resistance is controlled in dependence on the control button position. This is then used in a motor control circuit, for example a transistor circuit with variable load depending on the resistor setting. The sliding contacts function as a second actuator for controlling the motor speed when the button is further depressed.

This design makes use of a micro switch for the power on/off function. Speed setting resistors are connected by lead tracks on the PCB. This arrangement enables a minimum control button path length. The micro switch power switch is activated first, and the speed is regulated according to the subsequent path of the control button.

For example, after the power switch is activated, at first the device will not rotate. After a travelling distance of 2 mm for example, the device starts rotating with speed setting 1. For an additional travelling distance of for example 1 mm, the speed remains at speed 1. After a total travelling distance of 3 mm the slider 52 then switches to the next resistor and the speed is set to speed setting 2. The progressive movement of the carrier thus causes the speed control circuit to steps through the speed settings.

The resistor tracks can be designed to provide a speed according to an arithmetic function in relation to the depression of the control button. The function could be linear, exponential, cascading or any other suitable function. Although not shown, the blender can further include a separate turbo boost switch. Alternatively, a turbo boost function can be implemented by the single switch, for example at the maximum movement (maximum depression) of the control button position. The turbo boost function can provide a step increase in speed when the control button is fully moved (e.g. fully depressed). Thus, the speed control enables selection of a speed from a set of speeds in a first range, or selection of a speed which is larger than the highest speed in the first range, and also a larger increase in speed compared to the difference in speed between any adjacent speeds in the first range.

When the user operates, i.e. presses the control button, the switch slides along a predefined path of approximately 1 mm until the spring loaded pin contacts the micro-switch. This initial 1 mm clearance provides a safety measure to ensure that the return spring does indeed disengage the power switch.

The pin is preloaded with a spring-force to be able to immediately activate the micro-switch, which has a switching path of approximately 1 mm. For example, the spring force of the spring loaded pin can be higher than the spring force of the return spring.

In this way, it can be ensured that the total path is approximately 2 mm which is a desirable value based on bar-blender consumer application tests. Preferably, this path length is less than 3 mm, and it may be 2 mm or less.

Once the power switch is activated, the motor and its attached tool begin to rotate slowly. In one example, the user can further move the control button along its pathway for up to 8 mm to adjust the required speed. During this movement, the pin depresses 44 into the carrier 40 against the spring 45. After 8 mm, the carrier meets mechanical stops. If a turbo boost function is provided, it can be enabled only when the control button is in this mechanically stopped fully depressed position.

When the user releases the control button, the switch is returned to the starting position and is disconnected from the power source by deactivation of the micro-switch. Thus, the total path length can in this example be kept to 10 mm or less. It is generally preferred that this path length is less than 20 mm.

The example above makes use of a micro switch for the power switch.

Figure 7:
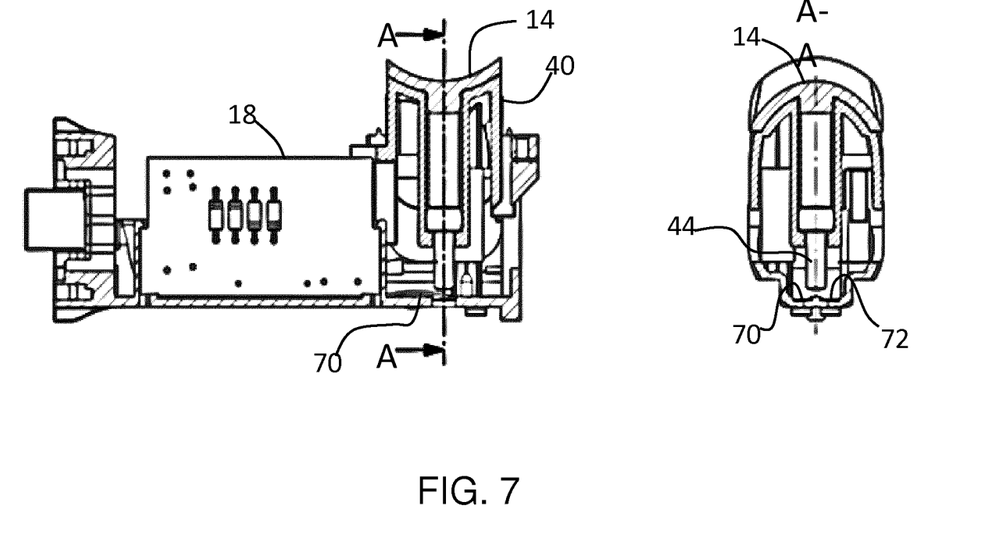
FIG. 7 shows a first alternative implementation of the power switch.

FIG. 7 shows a first alternative implementation of the power switch, and shows cross sections taken at two perpendicular angles. The same reference numbers are used as in the first example for the same components. The switch again has a spring loaded pin 44 (the spring is not shown in FIG. 7), but in this arrangement, the pin is for providing a short by directly contacting two spaced apart contact electrodes 70,72 at the base of the housing. This can provide an even more compact arrangement with fewer components. The spring force of the spring loaded pin is designed to ensure that reliable electrical contact is maintained.

Figure 8:
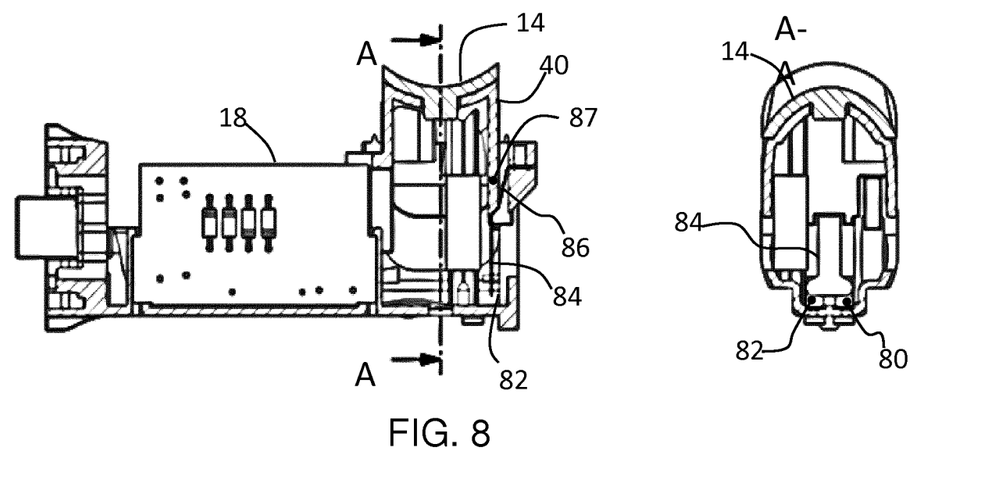
FIG. 8 shows a second alternative implementation of the power switch.

FIG. 8 shows a second alternative implementation of the power switch.

A pair of electrical contacts 80, 82 is provided laterally near the base of the housing. A shorting member 84 is mounted within the housing for shorting the contacts. The shorting member 84 is biased into a non-shorting position (as shown in FIG. 8) by a spring steel configuration 86, and the shorting member is moved into contact with the pair of electrical contacts when the button is first depressed.

The shorting member 84 is pushed against the contacts 80, 82 by a wedge 87, which engages with a face of the shorting member 84 when the button is depressed. The wedge 87 is part of the movable carrier 40 so moves down when the carrier is depressed. The spring bias of the shorting member 84 ensures that the electrical contact is broken when the button is released.

The example above makes use of a coil spring as the return spring. However, other springs may be used, such as a leaf spring.

In the example above, the speed control is by moving a contact with respect to a resistor track arrangement. However, the speed control may be an actuator which engages with a speed control lever of a speed control circuit, rather than acting as the actual electrical contact. Thus, instead of the moving contact and the PCB together forming a variable resistor circuit, there may be a discrete speed control circuit on the PCB (such as a potentiometer circuit) which is then mechanically operated by movement of the control button. Other speed control modules may also be used instead of a resistor or potentiometer circuit. More generally, any travel sensing circuit can be used, which is then controlled by a travel element. The travel sensing circuit can for example be based on resistive, inductive or capacitive travel sensing. Further alternative travel sensing approaches include optical sensing or magnetic field sensing arrangements, in which movement results in a change of optical illumination or magnetic field.

In the detailed examples above, the control button and its carrier slide in and out of the housing, and the control button is depressed by the user pushing the control button. The control button may instead pivot and still give essentially the same user experience. A further alternative is for the control button to slide horizontally (i.e. parallel with the surface of the outer housing) instead of vertically into and out of the housing volume. Thus, while the example above discussed the pushing of the control button from an initial non-depressed position into a fully depressed position, the invention relates more generally to control buttons which are moved between an initial and final position in any suitable manner.

It may be desirable to provide tactile or audible feedback to the user, for example by providing a clicking sensation by vibrating the control button, or by providing a clicking sound or providing an indication at a display or with a light. This gives the user a sensation of greater control. Each click may correspond to a different potentiometer setting and therefore speed setting. The sound and tactile feedback can be achieved by providing a spring loaded metal contact which slides against a set of teeth when the control button is moved. The variation in force needed provides tactile feedback and also a sound can be in this way if desired.

To improve on, or add to, this type of feedback, the invention provides a mechanical form of visual feedback, in the modification of the bar blender shown in FIGS. 9 to 12. The same numerals are used to denote corresponding elements of the bar blender throughout the drawings, and so will not be repeated. The modification is in the top portion of the blender, which links the control button to a visual display.

Figure 9:
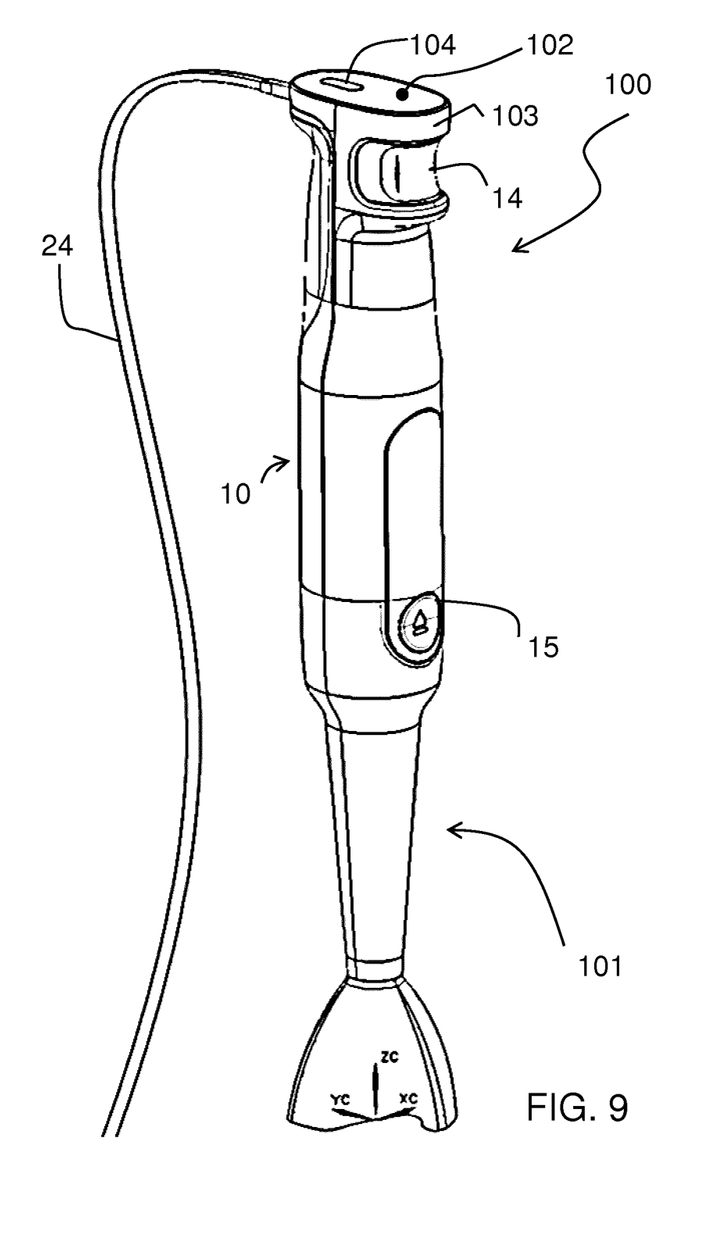
FIG. 9 is a perspective view from the right of a bar blender similar to that of FIGS. 1 to 8 but embodying the present invention of the visible speed setting display.

The bar blender 100 embodying the invention has a visual display 103 forming the top portion of the main housing 10. A top cover 102 to the visual display 103 is flat and oval in this example and has a transparent elongate portion 104 forming a window visible by the user when the blender is held generally vertically in use. In the example shown, the visual display 103 is generally normal to the principal vertical axis of the main housing, so that its window 104 is also generally horizontal. However, the top cover 102 could be inclined, preferably up to 30 degrees to the horizontal, sloping downwards to the rear of the blender in use, which is the side of the cable 24, so that the window 104 remains clearly visible.

The blender blade 101, or another tool such as a whisking tool, is clipped onto the lower end of the main housing and is releasable by activating the release button 15.

Figure 10A:
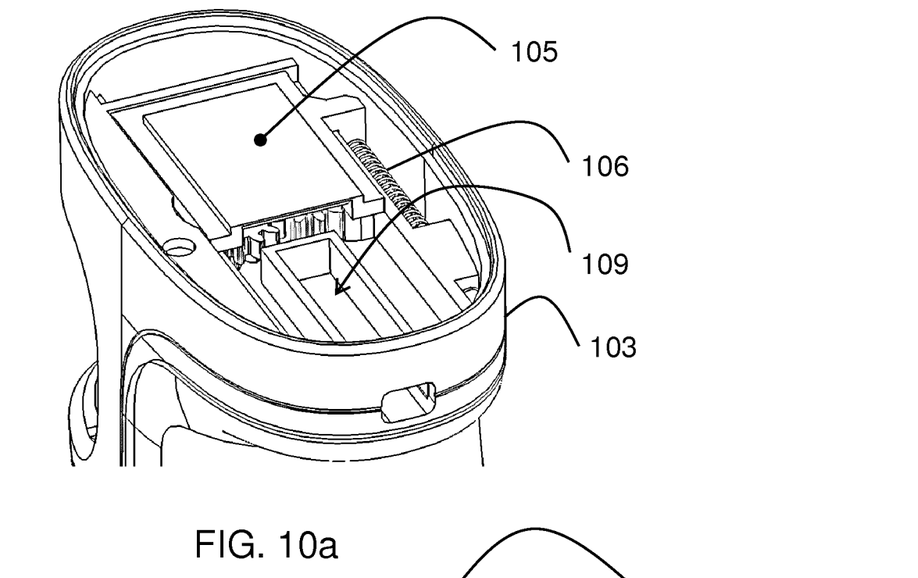
FIGS. 10a to 10e are different partial views of the top of the bar blender of FIG. 9 showing the mechanical linkage between the control button and the visual display.

The visual display 103 is shown more clearly in FIGS. 10a to 10e, 11 and 12. FIG. 10a shows the top part of the blender without the top cover 102 and cable 24 and without an index plate 107 which is described below with reference to FIG. 11. A recess 109 accommodates the cable 24 which connects to the PCB 18 (not shown). A movable display element 105 in the form of a slider is guided horizontally by rails to slide between a fully retracted position as shown and a fully advanced position covering the cable recess 109. A spring, e.g. a coil spring 106 in compression is positioned between a lug on the slider 105 and a fixed lug in the housing, to urge the slider to its retracted position, against the action of the control button as described below.

Figure 10B:
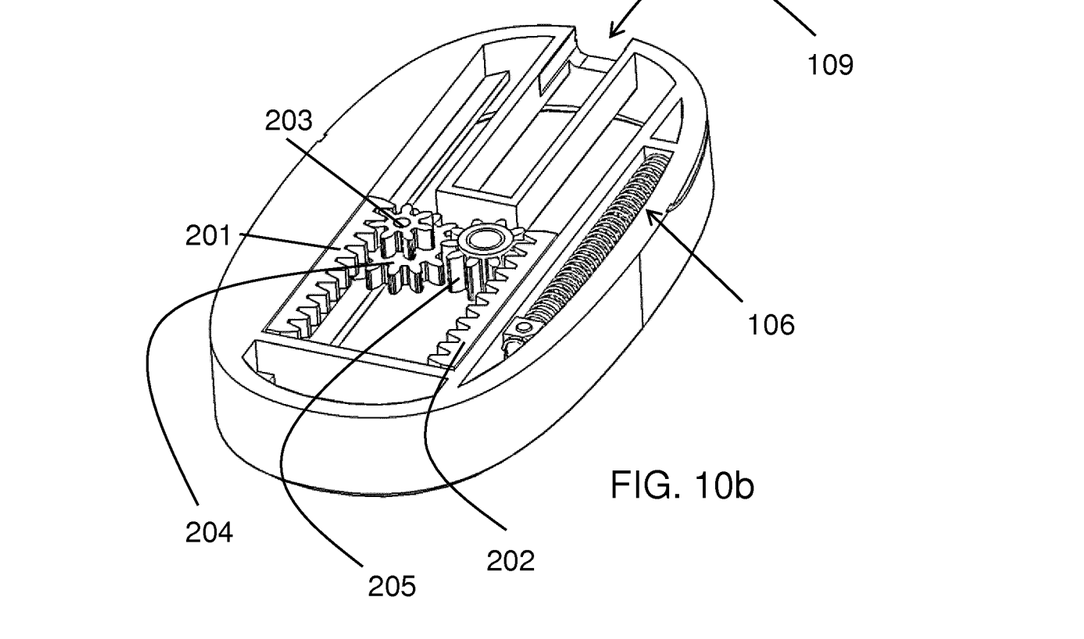
Figure 10C:
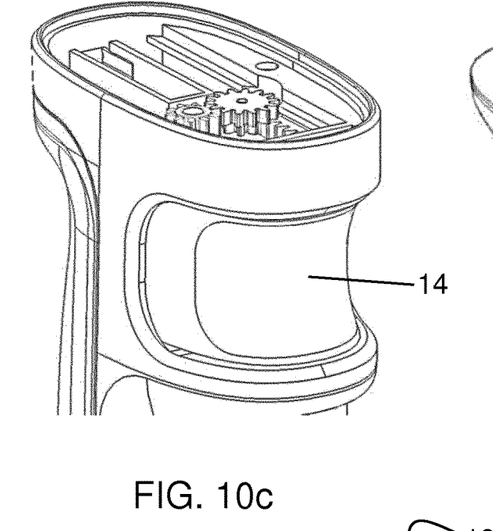
Figure 10D:
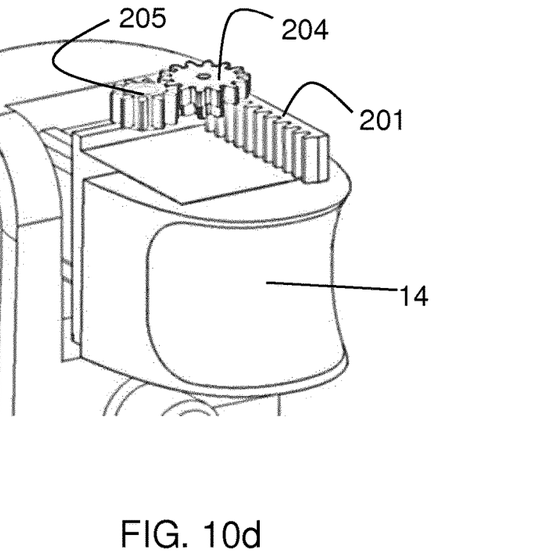
Figure 10E:
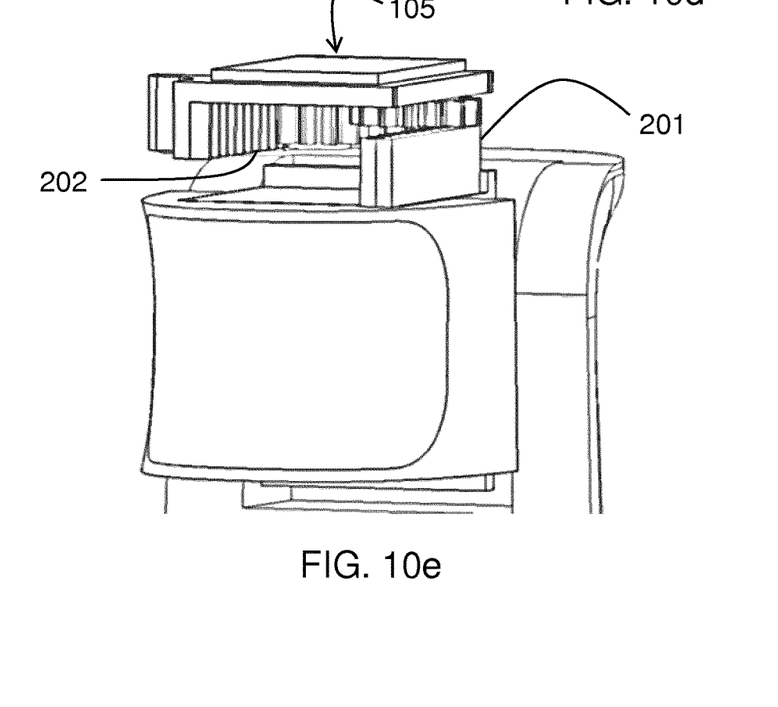

As shown in FIG. 10b which is a partial perspective view from below, and FIGS. 10c to 10e which are partial views from the side, a mechanical linkage 201, 202, 203, 204 and 205 allows the control button 14 to move the slider 105 directly, so that the position of the slider corresponds to the position of the control button, and therefore indicates the speed setting. A gearing ratio of 2 is provided by the teeth ratio (6:12) between gears 203 and 204 of a worm gear arrangement, so that the slider moves twice as far and twice as fast as the button. A horizontal worm gear 201 is connected to the top of the control button 14, and meshes with the gear 203 which is coaxial with and is connected to the gear 204. Gear 204 meshes with gear 205 which meshes with a horizontal worm gear 202 connected to the slider 105. Thus all the gears operate in parallel horizontal planes with vertical axes.

The gearing ratio can be any convenient value, for example 1.5 to 3, but it is found that the gearing ratio 2 gives a suitable range of movement of the slider that is easily visible at the distance the bar blender is held away from the user's head. Even a gearing ratio of unity, i.e. with no travel length amplification, could still be workable.

Figure 11:
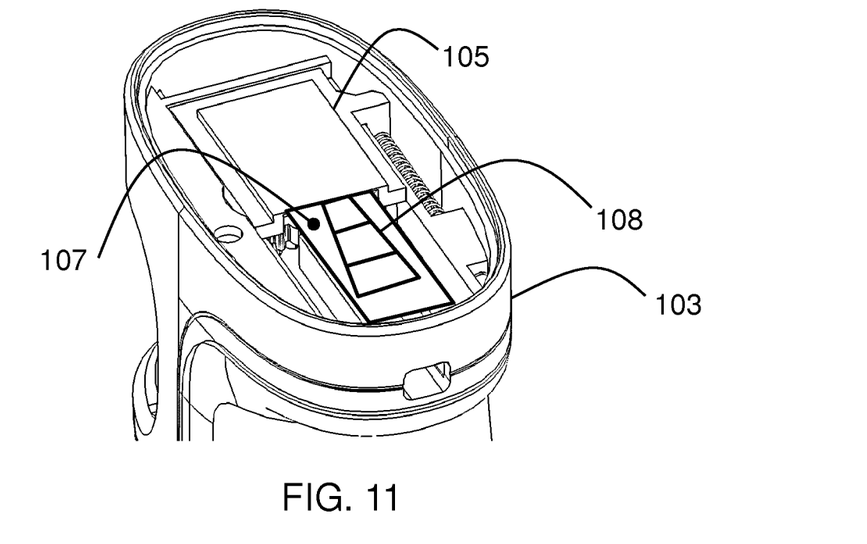
FIG. 11 is a partial perspective view of the bar blender of FIG. 9 from the top showing a movable display element and a fixed display element.

The end of the cable 24 is covered over its recess 109 and anchored by a plate (not shown) which carries an index plate 107 as shown in FIG. 11. In this example, the visual index on the plate is an icon in the form of an isosceles trapezoid divided into three sections, representing slow, medium and fast speeds, but other shapes are possible, and colors may be used that vary along the plate to denote speed. The slider 105 slides over the index plate 107 to obscure the index by an amount corresponding to the control button depression.

The window 104 may be wide enough to reveal the whole width of the trapezoid 108 so that the width of the icon at the end edge of the slider 105 denotes the speed.

Figure 12:
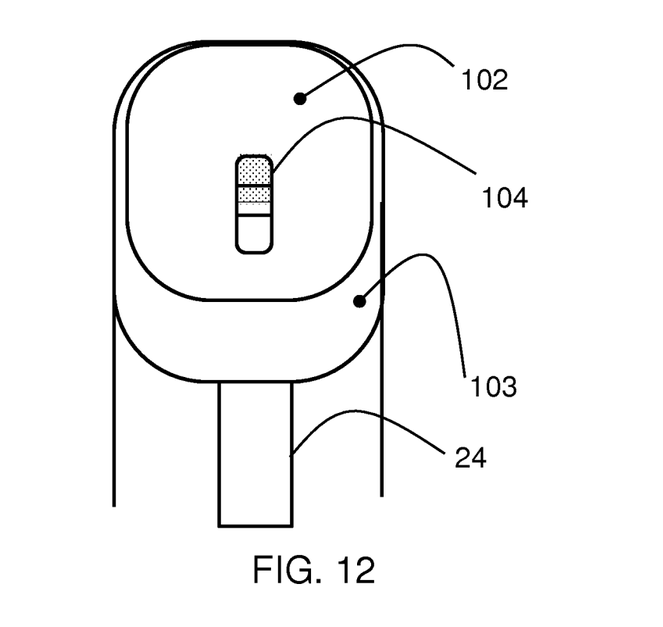
FIG. 12 is a partial perspective view of the bar blender of FIG. 9 from the top and the rear showing the cover of the visual display with a transparent window through to the cooperating movable and fixed display elements.

Alternatively, only a central strip of the index is visible through the window 104, in the overlying cover 102 as shown in FIG. 12. In such a case, the index is simply a set of parallel index lines across the width of the window. The slider is translucent to allow the lines to be seen, but the slider shows a color change. For example, a proportion of the index then appears to have a different color, and the index lines are still visible to provide a quantitative measure.

Many different designs of visual display are envisaged, incorporating a slider such as the slider 105. The slider itself could bear an icon, the extent of the icon visible through the window then indicating speed, in which case there is no need for the index plate 108. The window 104 could comprise a screen including an index or icon through which the light reflected from the slider 105 is visible, so as to indicate speed according to the progression of the slider under the window.

Any display design is possible by which the physical position of the slider is easily visible and provides an intuitive indication of a drive level.

The visual display could instead be on another part of the main housing, remote from the control button 14 and still visible to a user operating the bar blender, with the mechanical linkage appropriately positioned to couple it to the button 14.

The visual display represents the speed setting which has been set by the user's degree of depression of the control button. This may not necessarily represent the actual motor speed, which, depending upon the type of electric motor, may vary with the load on the blender tool or with temperature, and may depend on other factors. Nonetheless, this display has been found to give the user an immediate, clearly visible and reliable guide of the current speed setting to enable the user to vary the speed according to the condition of the mixture being blended. This could be for example to start whisking cream or egg-white slowly to prevent splashing and then smoothly accelerate; or to pulse with a slow speed when chopping onions or garlic, to prevent over processing; or to pulse with a medium speed when chopping parsley to get a finely cut result whilst preventing over processing.

Whilst the example described with reference to the drawings has a single button control for on-off and for speed/power level, this is not essential—there could be a separate on-off control, e.g. button or switch at a different location.

In the example above, the position or stroke of the control button is used to provide an output to the user which represents the speed setting. As far as the user is concerned, the control button is for controlling speed—the greater the button is depressed, the greater the speed.

This is however an approximation, in that the control button in fact controls the power delivered to the motor. The speed which eventually results will depend on the mixture being processed. For example, a blender driven to full speed in low viscosity fluid will rotate faster than in thicker viscous fluid. Thus, the speed indication to the user is a relative indicator. For a given substance being blended (and while the viscosity remains the same), the speed indicator gives an indication of relative speed.

It may instead be of interest to provide information about the actual motor power consumption, for example for energy monitoring purposes. In such a case the visual display may be further adapted to provide the user with a continuous visual indication of the motor power consumption. This may for example be provided as a power consumption scale provided adjacent the transparent elongate portion 104 (the window) so that a power level may be determined based on the position of the slider.

Thus, the system as described above may be considered to provide a visual indication of an approximation to the blender speed, but the same system may be used to provide a more accurate indication of the power supply to the motor. For this purpose, a scale may be used which translates between the control button position and a power level based on the electrical and mechanical design of the blender.

This power supply indication, based on mechanical actuation level rather than electrical signal monitoring, may be used in other types of kitchen appliance. Thus, more generally, another aspect of the invention provides a kitchen appliance (for example a bar blender) comprising:

a main housing having a handle grip portion;
a motor within the housing for driving a rotary food processing member (for example a blender blade);
a speed control circuit in the housing for controlling the speed of the motor by controlling the power supplied to the motor;
a manual speed control element for operating the speed control circuit to set the motor speed to one from a corresponding range of motor speeds; and
a visual display on the main housing remote from the button and facing the user in use,
wherein the visual display is for indicating the power supplied to the motor based on the amount of actuation of the manual speed control element.

In this way, a manual speed control element, i.e. a mechanical input device, is used to determine the power supplied, by using the mechanical actuation itself rather than by taking electrical measurements for example of voltage and/or current. Thus, a simple mechanical arrangement is provided for giving an electrical power indication.

The manual speed control element may again comprise a control button located at the handle grip portion for progressive movement by a user over a predetermined continuous range to operate the speed control circuit to set the motor speed to one from a corresponding range of motor speeds, and the visual display may again comprise a movable display element for indicating the control button position over a predetermined range of positions indicative of the motor speed set by the user, and a mechanical linkage between the control button and the visual display to cause the movable display element to follow the control button as it is moved by the user thereby to provide the user with a continuous visual indication of the actual power supplied to the motor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:
1. A bar blender comprising:
a main housing having a handle grip portion;
a motor within the main housing for driving a blender tool;
a speed control circuit in the main housing for controlling a speed of the motor;
a control button located at the handle grip portion for progressive movement by a user over a predetermined continuous range to operate the speed control circuit to set the motor speed to one from a corresponding range of motor speeds; and
a visual display on the main housing remote from the control button and facing the user in use, wherein the visual display comprises a display element for indicating the control button position over a predetermined range of positions indicative of the motor speed set by the user,
wherein a mechanical linkage is provided between the control button and the visual display to cause the display element to provide the user with a continuous visual indication of the motor speed setting as the control button is moved by the user.

2. The bar blender in of claim 1, wherein the display element is a movable display element, caused by the mechanical linkage to follow the control button as the control button is moved by the user.

3. The bar blender of claim 1, wherein the speed control circuit comprises a travel sensing circuit, and wherein the control button is arranged to drive a travel element for controlling the travel sensing circuit to set the motor speed.

4. The bar blender of claim 1, further comprising a return spring for biasing the control button to an initial button position corresponding to an end of a range of button positions and to a zero position for the motor speed indicated by the display element; and other end of the range of button positions and display positions corresponding to a maximum motor speed setting.

5. The bar blender of claim 1, wherein the control button is moved by pushing, thereby to depress the control button.

6. The bar blender of claim 1, wherein the visual display is on an end surface of the main housing remote from the blender tool.

7. The bar blender of claim 1, wherein the visual display comprises an index to indicate the motor speed setting.

8. The bar blender of claim 1, wherein the display element is arranged to move relative to a fixed display element to provide a variable display indicative of the motor speed setting.

9. The bar blender of claim 8, wherein the movable display element and/or the fixed display element has a color pattern or a line pattern such that a relative position of the movable display element provides a variable color or the line pattern as a variable display.

10. The bar blender of claim 1, wherein the mechanical linkage comprises means for providing a predetermined gearing ratio between the movements of the control button and of the display element.

11. The bar blender of claim 1, wherein the mechanical linkage comprises meshing gears to cause the control button to drive the display element with a predetermined gearing ratio.

12. The bar blender of claim 1, wherein the mechanical linkage comprises a worm gear coupled to each of the display element and the control button, and gears meshing with the worm gears to cause the control button to drive the movable display element with a predetermined gearing ratio.

13. The bar blender of claim 10, wherein the predetermined gearing ratio is from 1 to 3.

14. The bar blender of claim 1, wherein the visual display is further adapted to provide the user with a continuous visual indication of the motor power consumption.

15. A kitchen appliance comprising:
a main housing having a handle grip portion;
a motor within the main housing for driving a rotary food processing member;
a speed control circuit in the main housing for controlling a speed of the motor by controlling a power supplied to the motor;
a manual speed control element for operating the speed control circuit to set the motor speed to one from a corresponding range of motor speeds; and
a visual display on the main housing remote from a button and facing a user in use,
wherein a mechanical linkage is provided between the manual speed control element and the visual display to indicate the power supplied to the motor based on an amount of actuation of the manual speed control element.

* * * * *